J. A. TAYLOR.
EYEGLASS SUPPORT.
APPLICATION FILED APR. 21, 1919.
1,310,258.
Patented July 15, 1919.
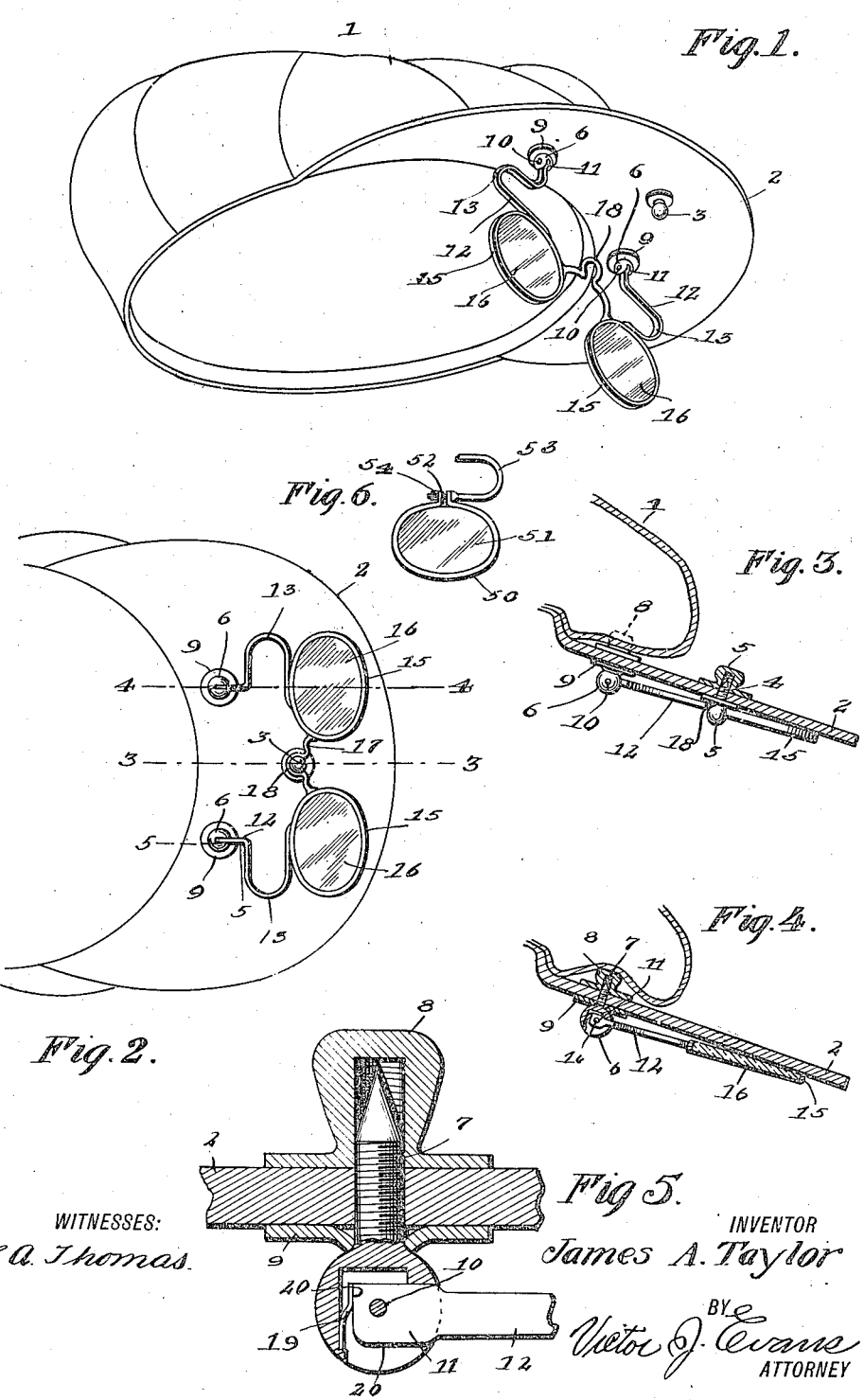

UNITED STATES PATENT OFFICE.

JAMES A. TAYLOR, OF WACO, KENTUCKY.

EYEGLASS-SUPPORT.

1,310,258.　　　　　　Specification of Letters Patent.　　Patented July 15, 1919.

Application filed April 21, 1919. Serial No. 291,435.

*To all whom it may concern:*

Be it known that I, JAMES A. TAYLOR, a citizen of the United States, residing at Waco, in the county of Madison and State of Kentucky, have invented new and useful Improvements in Eyeglass-Supports, of which the following is a specification.

This invention has reference to an eye glass or spectacle mount and may be considered in the nature of an improvement upon United States Letters Patent No. 1,288,284, granted me on December 17, 1918.

As in my referred to patent, the primary object of the present invention is to provide means whereby the mount may be suspended entirely free from the face of the wearer when the glasses are not required for immediate use and also whereby the same may be readily swung to proper position when desired for use.

A further object of the invention is to hingedly secure on the brim of a hat or the peak or vizor of a cap eye glass lens having means whereby the same may be sustained at any desired angle with respect to the brim or vizor to adjust themselves to the eyes of the user; which may be adjusted longitudinally with respect to the brim so that the glasses may be adjusted to suit different users; one which may be readily attached to or removed from the brim or vizor, and one which, when not in use is sustained in locked position upon the under face and in contact with the brim of a hat or the vizor of a cap.

Other objects and advantages will present themselves as the nature of the invention is better understood, reference being had to the accompanying drawing, in which:

Figure 1 is a perspective view looking toward the under face of a cap, and illustrating the application of the improvement thereon.

Fig. 2 is a bottom plan view, the lens being folded against and latched on the vizor.

Fig. 3 is a sectional view approximately on the line 3—3 of Fig. 2.

Fig. 4 is a sectional view approximately on the line 4—4 of Fig. 2.

Fig. 5 is a detail sectional view approximately on the line 5—5 of Fig. 2.

Fig. 6 is an elevation illustrating a slight modification.

While in the drawings my improvement is illustrated applied to the vizor of a cap, it is to be understood that the same may be attached to the brim of a hat.

The cap is indicated by the numeral 1 and the vizor thereof by the numeral 2.

To the under side of the vizor, centrally thereof I secure a headed member or lug 3. The lug is provided with a reduced threaded stem 4 that is passed through the vizor, and a cap member in the nature of an internally threaded nut is screwed on the stem, the said cap being indicated by the numeral 5.

On the vizor, inward of the stud 3 and arranged at an equal distance from the opposite sides of the said stud are what I will term socket members which are indicated by the numerals 6. Each of the socket members is formed with a pointed threaded shank 7 that is designed to be forced through the vizor, each of the said shanks being engaged, on the outer face of the vizor by cap nuts 8. The socket members are preferably formed with widened portions or flanges 9 that contact with the inner surface of the vizor, and pivotally secured, as at 10 in each of the said sockets 6 is a plate or head 11 formed or secured to one end of a spring lens support 12. Each of the supports 12 is preferably constructed of a thin strip of metal which may be in the nature of a spring wire and the same is bent or rounded upon itself as at 13. The wire members 12, while possessing an inherent resiliency are bendable and have their outer and free ends each secured to the eye glass mount which is indicated by the numeral 15. In the mount 15 is secured the usual lenses 16, and the nose piece 17 for the lens is preferably in the nature of a spring wire, being centrally formed with a rounded or looped portion 18 that is adapted to engage with the shank of the stud 3 and rest upon the said shank when the lens is moved against the inner face of the vizor out of operative position.

The pivoted heads 11 of the supports 12 are contacted each by a spring 19 secured in the socket members 6, and the said spring contacting with any of the angular edges 20 of the heads 11 hold the supporting wires 13 and the mount 15 at desired angles to meet the convenience of the user of the device.

In Fig. 6 the rim 50 for the lens 51 is in the nature of a split member, the ends thereof being offset as at 52. The support for the lens, indicated by the numeral 53 has a reduced threaded end that passes through alining openings in the offset ends 52 of the rim 50. The reduced extension is threaded and has arranged upon the outer end thereof a nut 54 which, contacting with one of the offset portions 52 compresses the rim around the lens.

It is thought, from the foregoing description, when taken in connection with the drawings, the simplicity of the construction and the advantages thereof will be readily apparent without further detailed description.

Having thus described the invention, what is claimed as new, is:—

1. In combination with the peak or brim of a cap or hat having a stud removably secured on the peak or brim sockets to the opposite sides of the stud, an eye glass mount, bendable supports therefor, each of said supports being pivotally secured in one of the sockets, said mount having a spring bridge piece which is centrally rounded and which is adapted to engage with the stud when the mount is swung against the peak or brim of the cap.

2. In combination with the peak or brim of a cap or hat, of a stud having a threaded shank that is passed through the peak or brim, a cap nut engaging said stud, socket members having threaded shanks passed through the peak or brim to the opposite sides of the stud, cap nuts for said shanks, an eye glass mount having a spring nose piece bent to provide a central rounded portion designed to engage with the stud when the mount is swung against the peak or brim, bendable supports for the mount each having a central rounded portion and an extension provided with a head that is received in and pivoted to the respective sockets, and a spring in each of the sockets contacting with the edges of the head, as and for the purpose set forth.

3. In combination with the peak or brim of a hat or cap having a stud removably secured thereon and additional studs to the opposite sides of the first mentioned stud, an eye glass mount pivotally secured to the last mentioned studs, said mount including split rim members removably and adjustably secured to the mount proper, a nose piece between the means having a central looped portion designed to engage with the first mentioned stud when the mount is swung against the peak or brim of the cap or hat.

In testimony whereof I affix my signature.

JAMES A. TAYLOR.